US012433438B2

(12) United States Patent
McMall

(10) Patent No.: US 12,433,438 B2
(45) Date of Patent: Oct. 7, 2025

(54) LIGHTABLE ORNAMENT DECORATION

(71) Applicant: Donald McMall, Roscommon, MI (US)

(72) Inventor: Donald McMall, Roscommon, MI (US)

( * ) Notice: Subject to any disclaimer, the term of this patent is extended or adjusted under 35 U.S.C. 154(b) by 51 days.

(21) Appl. No.: 18/587,018

(22) Filed: Feb. 26, 2024

(65) Prior Publication Data

US 2025/0268411 A1 Aug. 28, 2025

(51) Int. Cl.
*A47G 33/08* (2006.01)
*F21S 4/10* (2016.01)

(52) U.S. Cl.
CPC ...... *A47G 33/08* (2013.01); *A47G 2033/0827* (2013.01); *F21S 4/10* (2016.01)

(58) Field of Classification Search
CPC .......... A47G 2033/0827; A47G 1/0616; A47G 1/0622; F21S 4/10
See application file for complete search history.

(56) References Cited

U.S. PATENT DOCUMENTS

| | | | | | |
|---|---|---|---|---|---|
| 4,224,364 | A * | 9/1980 | Hunt | A47G 33/08 | 40/781 |
| 4,339,787 | A * | 7/1982 | Burnbaum | F21S 8/00 | 362/249.17 |
| 4,544,218 | A | 10/1985 | Sanders et al. | | |
| 4,592,936 | A * | 6/1986 | Ferguson | A47G 33/08 | 428/34.1 |
| RE34,717 | E * | 9/1994 | Sanders | A47G 33/0809 | 315/185 S |
| 5,458,930 | A * | 10/1995 | Brown | A47G 33/08 | 428/11 |
| 5,865,533 | A * | 2/1999 | Liu | G02B 6/0008 | 362/583 |
| 6,001,435 | A * | 12/1999 | Hardy | F21S 4/10 | 362/123 |
| 6,942,355 | B1 | 9/2005 | Castiglia | | |
| 7,448,773 | B2 * | 11/2008 | Lai | A47G 33/08 | 362/264 |
| 7,740,377 | B1 * | 6/2010 | Thomas | G08B 17/10 | 362/249.17 |
| 8,398,269 | B1 * | 3/2013 | Loomis | F21V 3/049 | 362/186 |
| 2003/0156405 | A1 * | 8/2003 | Kim | E01F 9/559 | 362/240 |
| 2006/0158888 | A1 * | 7/2006 | Wang | F21S 4/20 | 362/351 |
| 2007/0242455 | A1 * | 10/2007 | Fair | B44C 5/005 | 362/391 |
| 2008/0160224 | A1 * | 7/2008 | Nakamura | A47G 33/0818 | 428/7 |
| 2014/0218926 | A1 * | 8/2014 | Jackson | F21S 4/10 | 362/249.16 |
| 2014/0233234 | A1 * | 8/2014 | Bokun | F21V 17/007 | 362/249.06 |
| 2018/0202647 | A1 * | 7/2018 | Loomis | F21S 4/10 | |
| 2022/0183494 | A1 * | 6/2022 | LeBlanc | A47G 33/0863 | |

* cited by examiner

*Primary Examiner* — Alexander K Garlen

(57) ABSTRACT

Lightable ornament decorations consisting of a clear containment vessel, a string of light emitting diodes of a size to insert into the vessel, and a transformer that allows one to attach the string of light emitting diodes to AC current. A 120-volt, light emitting diode alternating current, lightable ornament.

19 Claims, 2 Drawing Sheets

LIGHTABLE ORNAMENT DECORATION

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

BACKGROUND OF THE INVENTION

The instant invention deals with lightable ornament decorations consisting of a clear containment vessel, a string of light emitting diodes of a size to insert into the vessel, and a transformer that allows one to attach the string to AC current.

A review of the prior art shows U.S. Pat. No. 4,544,218 that issued Oct. 1, 1985, to Sanders, et. Al. in which a connector is disclosed which permits an electrically illuminated ornament or the like to be readily connected to a string of conventional light sockets. This reference discloses the electrification of a bulb that is insertable into a plug assembly situated in an opening in a Christmas Ornament.

U.S. Pat. No. 6,942,355, that issued Sep. 13, 2005, to Castiglia deals with a lighting system that uses an electrical connection to power bulbs inserted in an opening in a decoration.

Neither of these references deal with an ornament that contains a string of LED lights entirely within the ornament that is powered using AC current.

BRIEF SUMMARY OF THE INVENTION

Thus, what is disclosed and claimed in this invention is a 120-volt, light emitting diode alternating current, lightable ornament. The ornament comprises a containment vessel wherein the containment vessel has an attachment loop mounted near the top.

The vessel has an opening into an interior of the vessel wherein the opening is located near the attachment loop. The vessel contains multiple light emitting diodes located on a continuous powerable wire of predetermined length which is attached to a power adapter (transformer) to control the multiple light emitting diodes. The power adapter has an input voltage of 100 to 240 Vac, 50-60 Hz output voltage, 3-vdc, and 1 ampere maximum.

Also contemplated within the scope of this invention is a 120-volt, light emitting diode alternating current, lightable ornament, wherein the ornament comprises a containment vessel, wherein the containment vessel has an attachment loop mounted near the top. The vessel has an opening into an interior of the vessel, wherein the opening is located near the attachment loop.

The vessel contains multiple light emitting diodes located on a continuous powerable wire of predetermined length and there is a power adapter to control the multiple light emitting diodes, the power adapter having an input voltage of 100 to 240 Vac, 50-60 Hz output voltage, 3-vdc, and 1 ampere maximum.

The containment vessel is modified to have an open back flat surface and a cover to cover a lower portion of the open back flat surface. The cover is located a predetermined distance from the open back flat surface to create a slot.

BRIEF DESCRIPTION OF THE SEVERAL VIEWS OF THE DRAWING(S)

DETAILED DESCRIPTION OF THE INVENTION

Figure 1:
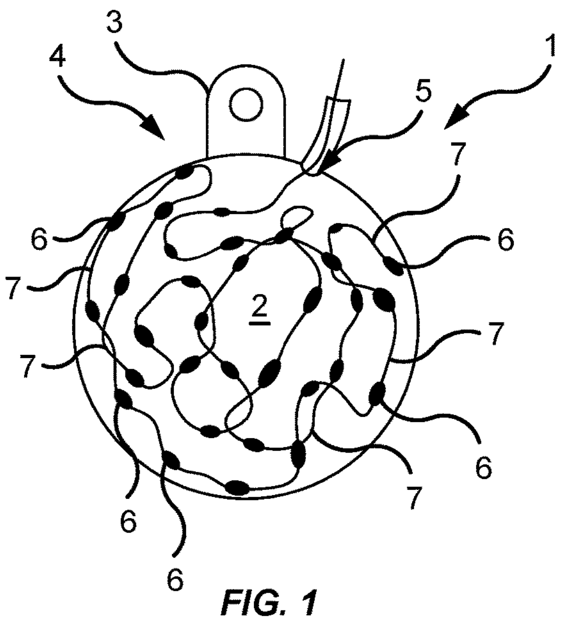
FIG. 1 shows a full view of an ornament of the invention.

Turning now to FIG. 1, there is shown a full view of an ornament 1 of this invention. There is shown the containment vessel 2, the attachment loop 3, the top 4, an opening 5, light emitting diodes 6, and a continuous powerable wire 7.

Light-emitting diodes (LEDs) are semiconductor devices that emit light when current flows through them. Electrons in the semiconductor recombine with electron holes, releasing energy in the form of photons. A convenient attribute of using LEDs in this invention is that they can be very small. LEDs can be purchased in large, small, and micro and thus can be adapted to the size and type of ornament that is desired.

Preferred for this invention are small LSDs or micro-LEDs. Most preferred are micro-LEDs. Such micro-LEDs, for example, are 50 to 100 mm in size and can be purchased from Amazon as “Fairylights” i.e. 80 medium LEDs.

Figure 4:
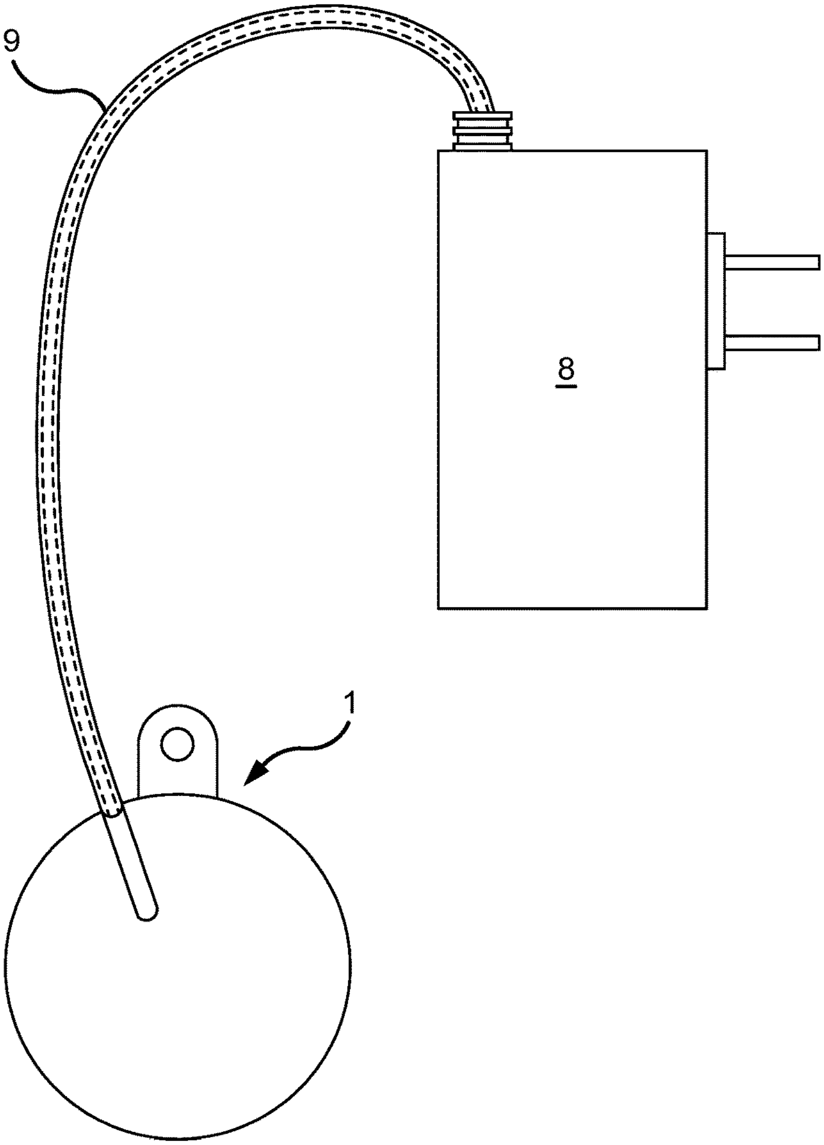
FIG. 4 shows a full view of a lightable ornament attached to a transformer.

FIG. 4 shows a full view of a lightable ornament attached to a power adapter (transformer) 8 by electrical wires 9. The power adapter conductors are directly connected to positive and negative conductors supplying power to a string of the LED lights which are inserted into the ornament vessel 2. By “into” it is meant that the entire string of LEDs is inside the vessel, not in the opening.

Figure 2:
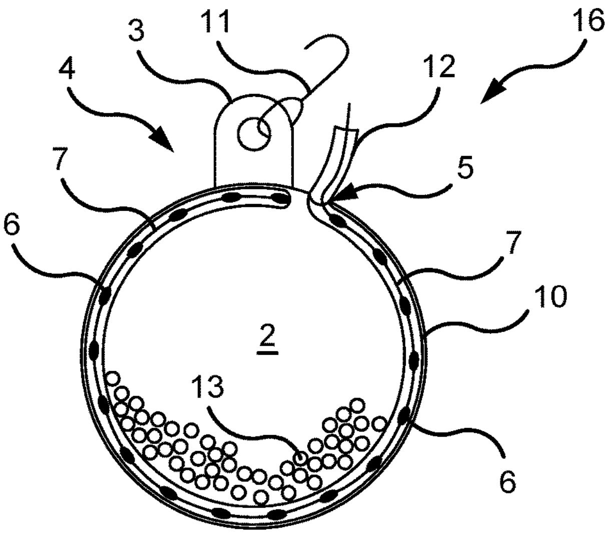
FIG. 2 shows a full view of another embodiment of the invention.

Another embodiment 16 of this invention can be observed in FIG. 2. There is shown all of the components of the device of FIG. 1 and in addition, the LEDs 6 are shown as a twisted cable 10 rather than random dispersion of the LEDs 6. Also shown is a tie 11 for the ornament that would allow the ornament to be suspended from, say a Christmas tree.

At the point that the wires 9 for the LED cable 10 enter through the opening 5, and there can, optionally, be a cuff 12 around the wires 9 to prevent them from chafing against the rim of the opening 5.

For purposes of decoration capability, there is shown in FIG. 2, particulate material 13. This particulate material can be any reasonable size. It can be configured as one desires such as balls, both macro and micro, triangles, slivers, and the like. In addition, these particulate materials can be colored or can be clear and can be white to imitate snow. The particulate material can be present in any quantity.

Figure 3:
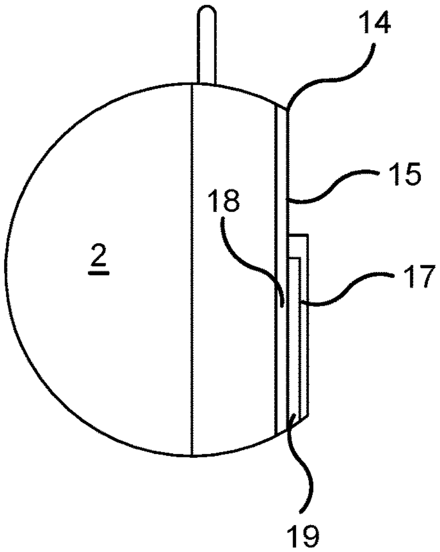
FIG. 3 shows a full side view of the embodiment of FIG. 2.

FIG. 3 is a full side view of the ornament 16 of FIG. 2 without the LEDs present. There is shown a vessel 2 that has been modified to provide a flat surface 14 at the back 15 of the vessel 2. The vessel 2 has attached a cover 17 to cover a lower portion 18 of said open back flat surface 14, said cover 17 being located a predetermined distance from the open back flat surface 14 to create a slot 19. The slot 19 can be used to insert designs or pictures 20 to further enhance the novelty of the vessel 2.

Figure 5:
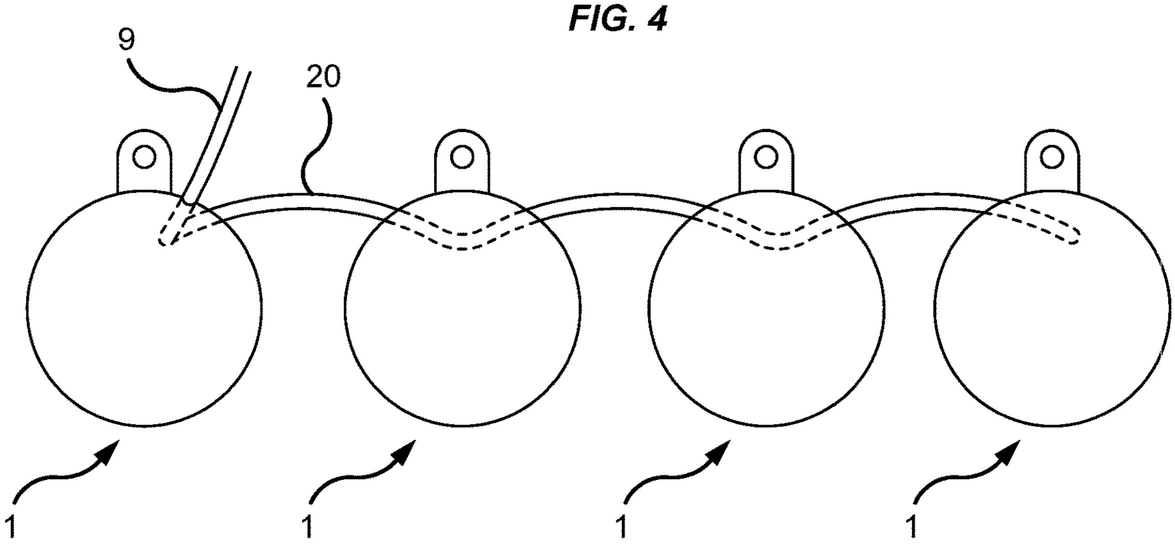
FIG. 5 shows a string of lighted ornaments according to this invention.

FIG. 5 shows a string of ornaments 1 that are connected to each other via a continuous electrical wire 21. The length of the string is predetermined according to the volume of the vessel 2. Essentially any length that is reasonable can be used.

The particulate materials 13 and the vessels 2 can be manufactured from plastic or glass. Plastics that are convenient are, for example, acrylic, polycarbonate, and vinyl. The particulate materials 13 and the vessels 2 can be manufactured as clear, or they can be clear colored such as red, green, yellow, blue, and the like.

Although the invention has been described herein as using a round vessel, it is contemplated within the scope of this invention to utilize other configurations of the vessel, such a square, oblong, triangle, pentagon, hexagon, octagon, tubes, and the like.

The size of the vessels can vary and are used according to what the end use will accommodate and according to what materials are readily available.

The LEDs can be, when lit, clear white, colored, or a mixture of the foregoing.

The ornaments 1 of this invention are manufactured by providing a small opening near the top of the vessel 2 for insertion of the LED wired lights. Once enough lights have been installed according to the designer, then the wires are connected to the transformer.

For the ornament 16, any particulate material, if used, is first inserted into the vessel. The cable is then inserted into an opening in the top of the vessel and wired to the transformer.

What is claimed is:

1. A lighted ornament comprising:

a containment vessel, said vessel having an attachment loop mounted near a top thereof, said vessel having an opening into an interior of said vessel, said opening located near but spaced apart from said attachment loop;

said vessel containing multiple light emitting diodes located on a continuous power wire of predetermined length and particulate matter; and a power adapter connected to said wire to control said multiple light emitting diodes, said power adapter having an input of 100 to 240 Vac, at 50-60 Hz and an output voltage, of 3 Vdc-vdc at 1 ampere maximum.

2. The lighted ornament as claimed in claim 1, wherein the vessel is clear in color.

3. The lighted ornament as claimed in claim 1, wherein the vessel is clear colored.

4. The lighted ornament as claimed in claim 1, that wherein the vessel is manufactured from plastic.

5. The lighted ornament as claimed in claim 4, wherein the plastic is acrylic.

6. The lighted ornament as claimed in claim 4, wherein the plastic is polycarbonate.

7. The lighted ornament as claimed in claim 1, wherein the vessel is manufactured from glass.

8. A lighted ornament comprising:

a containment vessel, said vessel having an attachment loop mounted near a top thereof, said vessel having an opening into an interior of said vessel, said opening located near but spaced apart from said attachment loop;

said vessel containing multiple light emitting diodes located on a continuous power wire of predetermined length and particulate matter;

a power adapter connected to said wire to control said multiple light emitting diodes, said power adapter having an input of 100 to 240 Vac, at 50-60 Hz and an output, of 3 Vdc-vdc at 1 ampere maximum; said containment vessel being modified to have an open back flat surface; and a cover to cover a lower portion of said open back flat surface, said cover being located a predetermined distance from said open back flat surface to create a slot.

9. The lighted ornament as claimed in claim 8, wherein said vessel is clear in color.

10. The lighted ornament as claimed in claim 8, wherein said vessel is clear colored.

11. The lighted ornament as claimed in claim 8, wherein the particulate matter is clear in color.

12. The lighted ornament as claimed in claim 8, wherein the particulate matter is colored.

13. The lighted ornament as claimed in claim 8, wherein the particulate matter is mixed colors.

14. The lighted ornament as claimed in claim 8, wherein said slot is filled with a photograph.

15. The lighted ornament as claimed in claim 8, wherein said slot is filled with a design.

16. The lighted ornament as claimed in claim 8, wherein the vessel is manufactured from plastic.

17. The lighted ornament as claimed in claim 16, wherein the plastic is acrylic.

18. The lighted ornament as claimed in claim 16, wherein the plastic is polycarbonate.

19. The lighted ornament as claimed in claim 8, wherein the vessel is manufactured from glass.

* * * * *